(12) United States Patent
Yang

(10) Patent No.: US 12,459,553 B2
(45) Date of Patent: Nov. 4, 2025

(54) PORTABLE FOLDING WAGON

(71) Applicants: Qingdao Hongrunfa Machinery Co., Ltd., Qingdao (CN); Qingdao Ritashaw Machinery Co., Ltd., Qingdao (CN)

(72) Inventor: Zhenhua Yang, Qingdao (CN)

(73) Assignees: Qingdao Hongrunfa Machinery Co., Ltd., Qingdao (CN); Qingdao Ritashaw Machinery Co., Ltd., Qingdao (CN)

( * ) Notice: Subject to any disclaimer, the term of this patent is extended or adjusted under 35 U.S.C. 154(b) by 0 days.

(21) Appl. No.: 18/254,850

(22) PCT Filed: Jul. 15, 2022

(86) PCT No.: PCT/CN2022/105992
§ 371 (c)(1),
(2) Date: May 26, 2023

(87) PCT Pub. No.: WO2024/011593
PCT Pub. Date: Jan. 18, 2024

(65) Prior Publication Data
US 2025/0074489 A1  Mar. 6, 2025

(51) Int. Cl.
*B62B 3/02* (2006.01)
*B62B 5/06* (2006.01)

(52) U.S. Cl.
CPC ............ *B62B 3/02* (2013.01); *B62B 5/065* (2013.01); *B62B 2205/06* (2013.01)

(58) Field of Classification Search
CPC ....... B62B 3/02; B62B 5/065; B62B 2205/06; B62B 2301/05; B62B 3/007; B62B 3/025;
(Continued)

(56) References Cited

U.S. PATENT DOCUMENTS 10,099,711 B1 * 10/2018 Sun .................... B62B 3/007
10,207,729 B2 * 2/2019 Sun .................... B62B 5/065
(Continued)

FOREIGN PATENT DOCUMENTS

CN    205059673 U  *  3/2016  ............ B62B 3/007
CN    106428152 A  *  2/2017  ............ B62B 3/02
(Continued)

OTHER PUBLICATIONS

Translated CN-111038564-A (Year: 2025).*
(Continued)

*Primary Examiner* — James A Shriver, II
*Assistant Examiner* — Ian Bryce Shelton
(74) *Attorney, Agent, or Firm* — Hawaii Patent Services; Nathaniel K. Fedde; Kenton N. Fedde

(57) ABSTRACT

A portable folding wagon includes wheel components, four damping elements, a foldable load-bearing bottom frame, a foldable main frame, a telescopic handle assembly and a cloth basket. The wheel components include two fixed wheels arranged at a rear part of the portable folding wagon and two universal wheels arranged at a front part of the portable folding wagon. The foldable load-bearing bottom frame includes two lower rear connectors, two lower front connectors and an X-shaped folding load-bearing frame. The fixed wheels are arranged below the lower rear connectors through the damping elements, and the universal wheels are arranged below the lower front connectors through the damping elements. The damping elements include one or more of damping springs, cylinder dampers or variable damping force shock absorbers.

7 Claims, 11 Drawing Sheets

(58) Field of Classification Search
CPC ........... B62B 5/067; B62B 5/082; B62B 5/00; B62B 5/06
See application file for complete search history.

(56) References Cited

U.S. PATENT DOCUMENTS

| | | | | |
|---|---|---|---|---|
| 10,633,010 | B1* | 4/2020 | Zhang | B62B 3/025 |
| 11,370,467 | B1* | 6/2022 | Horowitz | B62B 3/007 |
| 11,667,313 | B2* | 6/2023 | Wu | B62B 5/067 |
| | | | | 280/651 |
| 11,851,097 | B2* | 12/2023 | Chu | B62B 3/007 |
| 12,012,139 | B2* | 6/2024 | Sun | B62B 3/007 |
| 12,122,440 | B2* | 10/2024 | Yang | B62B 3/007 |
| 2018/0327011 | A1* | 11/2018 | Horowitz | B62B 3/025 |
| 2018/0354536 | A1* | 12/2018 | Sun | B62B 3/007 |
| 2021/0107549 | A1* | 4/2021 | Wang | B62B 3/007 |
| 2021/0284216 | A1* | 9/2021 | Sun | B62B 3/02 |
| 2023/0042092 | A1* | 2/2023 | Yang | B62B 3/007 |
| 2023/0049293 | A1* | 2/2023 | Wu | B62B 3/007 |
| 2023/0094718 | A1* | 3/2023 | Zhou | B62B 3/025 |
| | | | | 280/651 |
| 2023/0227087 | A1* | 7/2023 | Sun | B62B 3/025 |
| | | | | 280/42 |

FOREIGN PATENT DOCUMENTS

| | | | | | |
|---|---|---|---|---|---|
| CN | 107380224 | A | * | 11/2017 | ............ B62B 3/022 |
| CN | 109305205 | A | * | 2/2019 | ............ B62B 3/022 |
| CN | 111038564 | A | * | 4/2020 | ............ B62B 5/067 |
| CN | 210822360 | U | * | 6/2020 | ............ B62B 3/007 |
| CN | 211710882 | U | * | 10/2020 | ............ B62B 3/007 |
| CN | 212667418 | U | * | 3/2021 | |
| CN | 213862325 | U | * | 8/2021 | |
| CN | 214267686 | U | * | 9/2021 | |
| CN | 114407995 | A | * | 4/2022 | ............ B62B 3/02 |
| CN | 216374594 | U | * | 4/2022 | |
| EP | 2749472 | A2 | * | 7/2014 | ............ B62B 5/067 |

OTHER PUBLICATIONS

Translated CN-210822360-U (Year: 2025).*
Translated CN-211710882-U (Year: 2025).*
Translated CN-213862325-U (Year: 2025).*
Translated CN-214267686-U (Year: 2025).*

* cited by examiner

PORTABLE FOLDING WAGON

TECHNICAL FIELD

The present invention relates to the field of cart products, in particular to a portable folding wagon.

BACKGROUND TECHNOLOGY

Campers can build bonfires, have barbecues, have picnics or sing songs when they arrive at camping sites on foot or by car, which are also the most common camping activities. Camping places are usually in valleys, lakesides and seaside. Travelers who often engage in such small-scale activities, like other outdoor sports enthusiasts, are called backpackers, and in Chinese mainland, they are also called tour pals. In a process of camping, cars often can't enter the camping site, thus things, such as tents, food and so on, have to be carried by hand. However, in general, there are many things that need to be carried. In this case, the travelers have to carry them for several times, which will not only make people feel tired, but also be very troublesome. Based on the above problems, it is necessary to provide a cart that can solve the foregoing problem.

SUMMARY OF THE INVENTION

In view of the above technical problems, embodiments of the invention provide a portable folding wagon to solve the problem of goods transportation during camping activities.

A first aspect of an embodiment of the present invention provides a portable folding wagon, comprising:

wheel components, four damping elements, a foldable load-bearing bottom frame, a foldable main frame, telescopic handle assembly and a cloth basket;

the wheel components comprise two fixed wheels 11 arranged at a rear part of the portable folding wagon and two universal wheels 12 arranged at a front part of the portable folding wagon;

the foldable load-bearing bottom frame comprise two lower rear connectors 13, two lower front connectors 14 and an X-shaped folding load-bearing frame 15;

the fixed wheels 11 are arranged below the lower rear connectors 13 through the damping elements, and the universal wheels 12 are arranged below the lower front connectors 14 through the damping elements;

the damping elements comprise one or more of damping springs, cylinder dampers or variable damping force shock absorbers;

and the X-shaped folding load-bearing frame 15 comprises two metal support bars 151 playing a main supporting role and two auxiliary support rods 152; the two metal support rods 151 and two auxiliary support rods 152 are combined into an X-shape through a bottom connector 153, and the two metal support rods 151 and two auxiliary support rods 152 are foldable against the bottom connector 153; ends of the two metal support rods 151 are welded with connecting pieces 154; the connecting pieces 154 of the two metal supporting rods 151 are connected by a lower connecting plate 155; the lower connecting plate 155 is arranged underneath the bottom connector 153; and the two metal supporting rods 151 are foldable against the lower connecting plates 155.

Optionally,
the foldable main frame comprises two side frames without columns and two X-shaped support frames, and the side frames and the X-shaped support frames are foldable.

Optionally,
the side frames without columns comprise two X-shaped folding frames 21 connected by connecting joints 22; the X-shaped folding frames 21 comprise straight side rods 201 and bending side rods 202; middle parts of the straight side rods 201 and the bending side rods 202 are connected by pin shafts; and the middle parts of the straight side rods 201 and the bending side rods 202 are rotatable against the pin shafts and are foldable.

Optionally,
each of the X-shaped support frames comprises a straight rod 31 and a bending rod with convex middle parts 32, wherein a middle part of the straight rod 31 and the bending rod with convex middle parts 32 are connected by a pin shaft, and the straight rod 31 and the bending rod with convex middle parts 32 are rotatable around the pin shaft and are foldable.

Optionally,
the foldable main frame comprises four upright columns, two diagonal cross structure components respectively arranged on a left side and a right side, and two support frames respectively arranged on a front side and a rear side.

Optionally,
the diagonal cross structure components comprise diagonal cross support frames 41, sliding sleeves for the diagonal cross support frames 42, pivoting joints 43, free-rotating rivets 44 and diagonal cross support frames with curved head structures 45.

Optionally,
the support frames comprise a V-shaped support frame 51, an inverted V-shaped support frame 52 and sliding sleeves for support frames 53;
the V-shaped support frame 51 comprises two support rods 501 and a first rotary joint 502 connecting the two support rods together to form a V-shape; and
the inverted V-shaped support frame 52 comprises two support rods with curved head structures 503 and a second rotary joint 504 connecting the two support rods with curved head structures 503 to form a V-shape.

Optionally,
the telescopic handle assembly comprises a ring handle grip 61, an inner handle pipe 62, an intermediate handle pipe 63, a lock for inner handle pipe 64, a lock for outer handle pipe 65, an outer handle pipe 66, support connecting rods 67 and U-shaped connectors 68; an pipe plug for inner handle pipe 69 is provided on a bottom part of the inner handle pipe 62, and an intermediate handle plug 70 is provided on a bottom part of the intermediate handle pipe 63;

and one end of each of the U-shaped connectors 68 is respectively connected with the lower front connectors 14 through pin shafts, and another end of each of the U-shaped connectors 68 is respectively connected with the lower front connectors 14 through limiting springs 71.

Optionally,
the telescopic handle assembly comprises an inner handle pipe 81, an outer handle pipe 82, a ring grip 83, an unlocking connecting rod 84, an unlocking button 85, an upper compression spring 86, an unlocking seat 87, a shift fork 88, a lock seat 89, a lower compression spring 90, a locking block 91, a pipe plug for outer handle pipe 92, support connecting rods 93, and U-shaped connecting pieces 94;

and the telescopic handle assembly is connected to the lower front connectors 14 by the U-shaped connecting pieces 94.

Optionally, the two side frames with columns and the two X-shaped support frames form a folding frame without column through the upper connectors 17; and the cloth basket 16 is detachably arranged on the folding frame without upright columns through the upper connectors 17 and side connectors 18.

According to the portable folding wagon provided by the embodiments of the present invention, the damping elements are arranged between the wheel components and the foldable load-bearing bottom frame; the damping elements have excellent damping effects, so that the problem that items in the wagon are damaged due to unevenness of surfaces of the ground or bumps caused by other obstacles is effectively prevented during camping; at the same time, the foldable load-bearing bottom frame is X-shaped, and the metal support rods have greater strength and therefore can hold greater weights; the portable folding wagon provided by the present invention has excellent shock absorption performance, and is very suitable for conditions where there exists rugged roads and large vibration in the camp sites; and an overall volume of the portable folding wagon in the present invention is larger than the overall volume of a conventional cart, while a size of the portable folding wagon after being folded is smaller.

EMBODIMENTS

Technical solutions in the embodiments of the present invention will be clearly and completely described below with reference to the drawings in the embodiments of the present invention. Obviously, the described embodiments are only some of the embodiments of the present invention, but not all of them. Based on the embodiments of the present invention, all other embodiments obtained by those skilled in the art without creative labor belong to the protective scope of the present invention.

Embodiment 1

Figure 1:
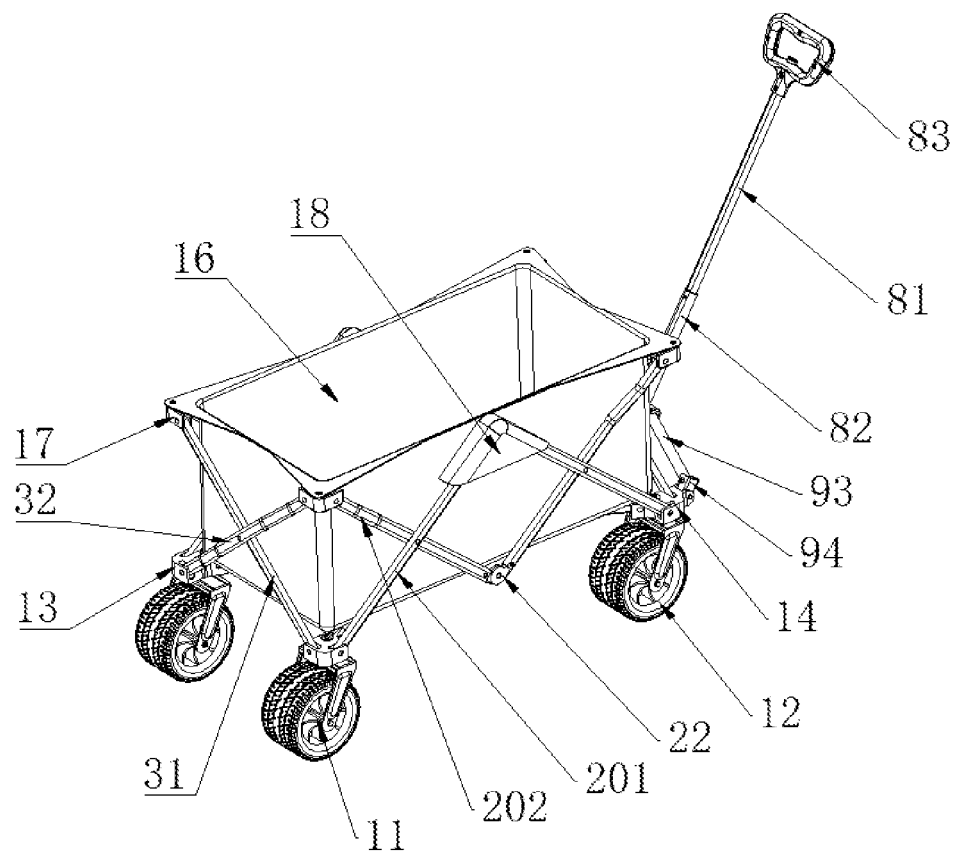
FIG. 1 is a schematic structural diagram of a portable folding wagon in the embodiment 1 of the present invention.
Figure 2:
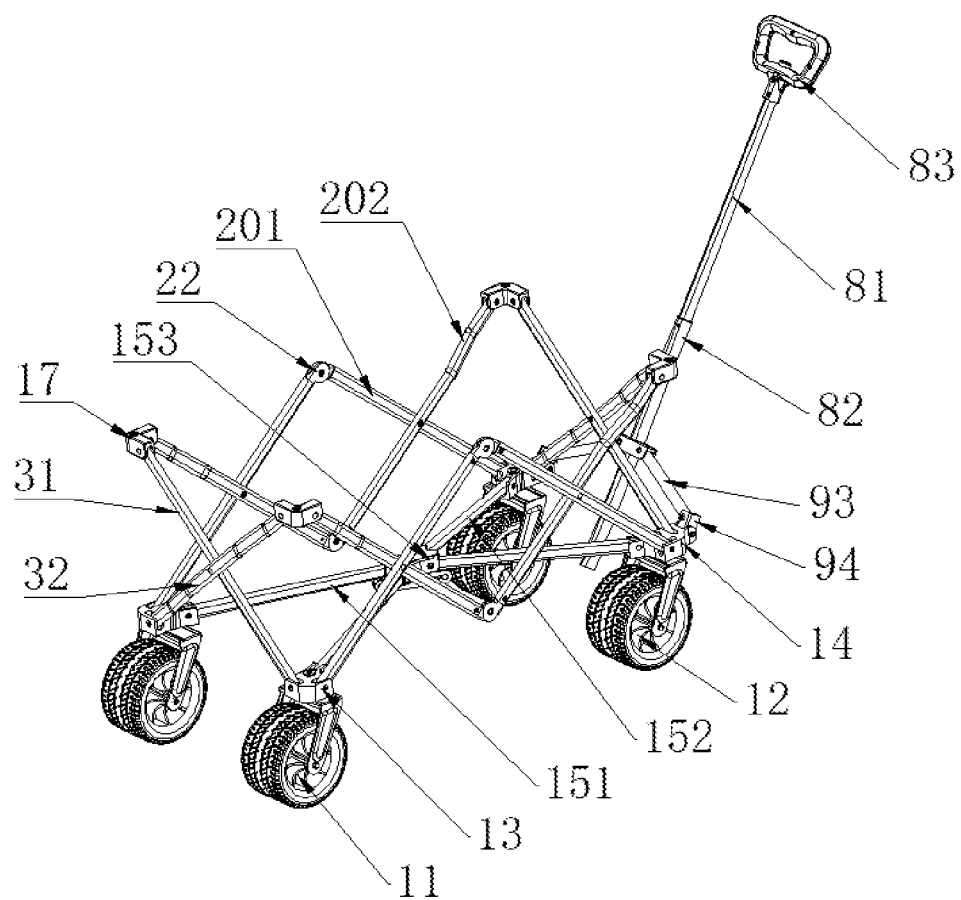
FIG. 2 is a schematic diagram of a structure (without a cloth basket) of the portable folding wagon in the embodiment 1 of the present invention.
Figure 3:
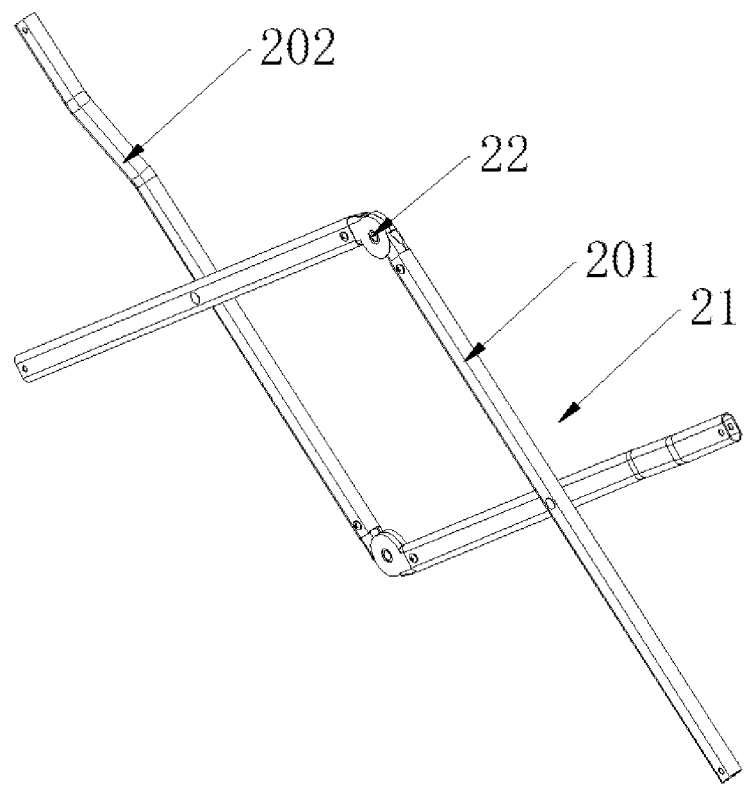
FIG. 3 is a schematic structural diagram of side frames without columns of the portable folding wagon in the embodiment 1 of the present invention.
Figure 4:
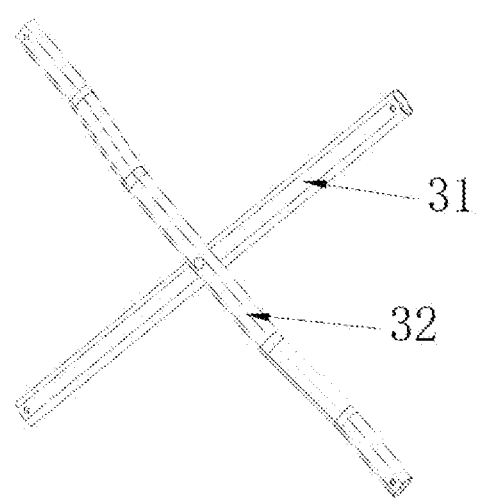
FIG. 4 is a schematic structural diagram of X-shaped support frames of the portable folding wagon in the embodiment 1 of the present invention.
Figure 5:
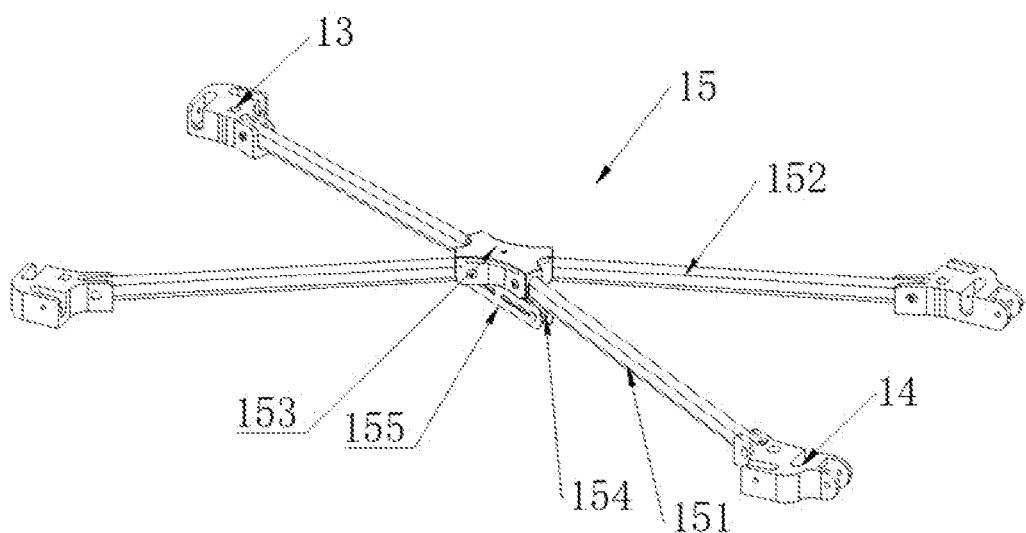
FIG. 5 is a schematic structural diagram of a foldable load-bearing bottom frame of the portable folding wagon in the embodiment 1 of the present invention.
Figure 6:
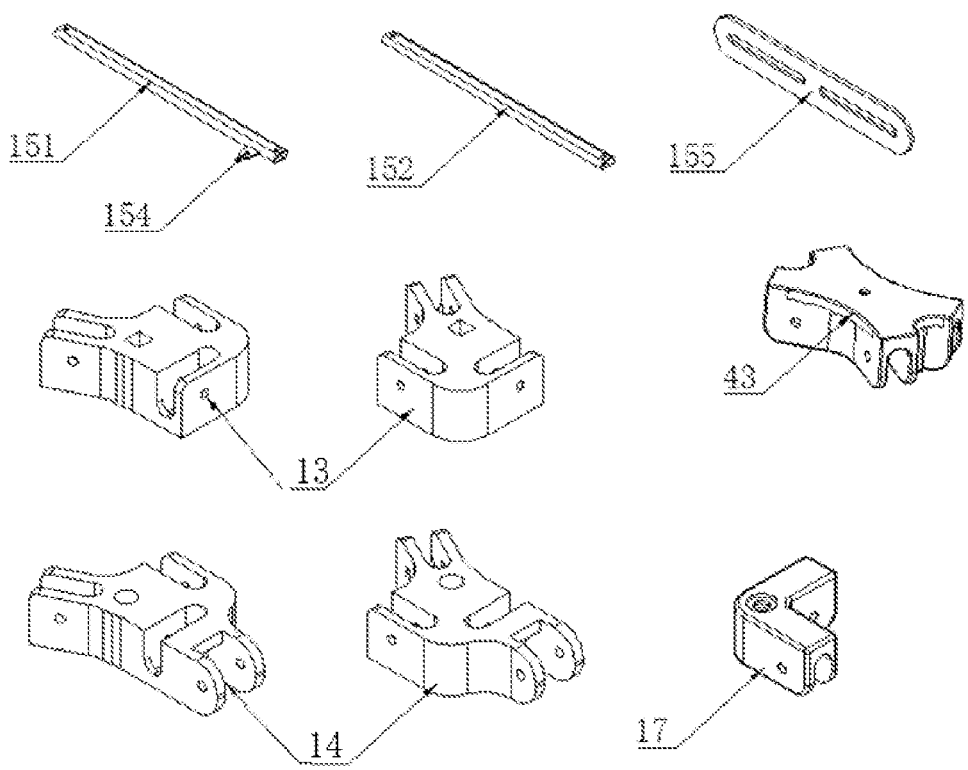
FIG. 6 is a schematic structural diagram of components of the foldable load-bearing bottom frame of the portable folding wagon in the embodiment 1 of the present invention.
Figure 7:
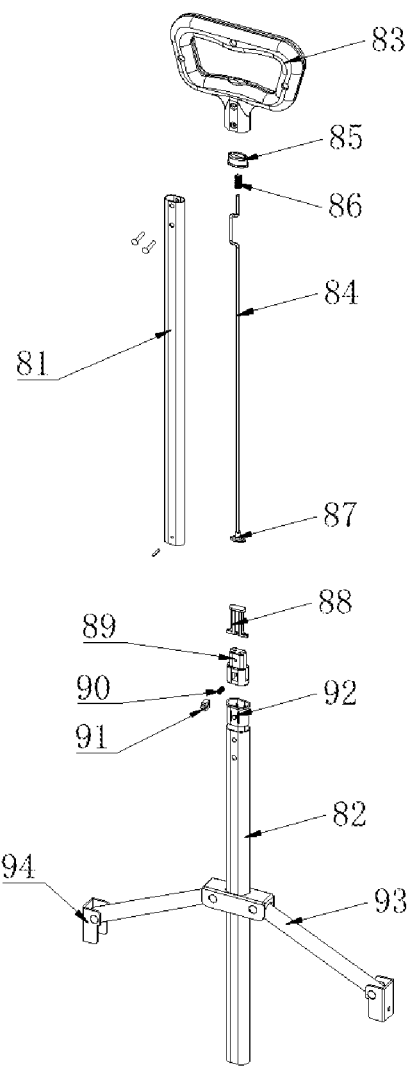
FIG. 7 is a schematic exploded diagram of a telescopic handle of the portable folding wagon in the embodiment 1 of the present invention.
Figure 8:
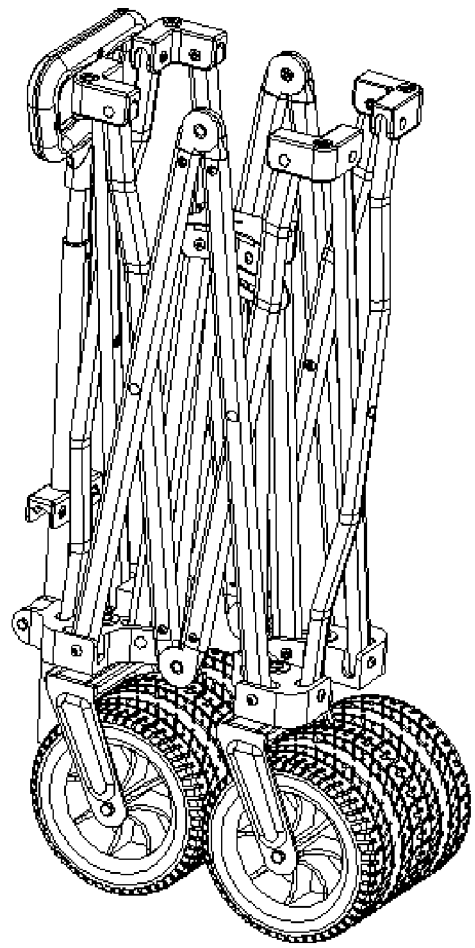
FIG. 8 is a schematic structural diagram showing a folding state of the portable folding wagon in the embodiment 1 of the present invention.

Referring to FIGS. 1-8, a portable folding wagon in one of the embodiments of the present invention comprises:

wheel components, four damping elements, a foldable load-bearing bottom frame, a foldable main frame, telescopic handle assembly and a cloth basket 16;

the wheel components comprise two fixed wheels 11 arranged at a rear part of the portable folding wagon and two universal wheels 12 arranged at a front part of the portable folding wagon;

the foldable load-bearing bottom frame comprise two lower rear connectors 13, two lower front connectors 14 and an X-shaped folding load-bearing frame 15;

the fixed wheels 11 are arranged below the lower rear connectors 13 through the damping elements, and the universal wheels 12 are arranged below the lower front connectors 14 through the damping elements;

the damping elements are one or more of damping springs, cylinder dampers or variable damping force shock absorbers;

and the X-shaped folding load-bearing frame 15 comprises two metal support rods 151 playing a primary supporting role and two auxiliary support rods 152; the two metal support rods 151 and two auxiliary support rods 152 are combined into an X-shape through a bottom connector 153, and the two metal support rods 151 and two auxiliary support rods 152 are foldable against the bottom connector 153; ends of the two metal support rods 151 are welded with connecting pieces 154; the connecting pieces 154 of the two metal supporting rods 151 are connected by a lower connecting plate 155; the lower connecting plate 155 is arranged underneath the bottom connector 153; and the two metal supporting rods 151 are foldable against the lower connecting plates 155.

Optionally, the foldable main frame comprises two side frames without columns and two X-shaped support frames, and the side frames and the X-shaped support frames are foldable.

Optionally, the side frames without columns comprise two X-shaped folding frames 21 connected by connecting joints 22; the X-shaped folding frames 21 comprise straight side rods 201 and bending side rods 202; middle parts of the straight side rods 201 and the bending side rods 202 are connected by pin shafts; and the middle parts of the straight side rods 201 and the bending side rods 202 are rotatable against the pin shafts and be foldable.

Optionally, the X-shaped support frames comprise a straight rod 31 and a bending rod with convex middle parts 32, wherein a middle part of the straight rod 31 and the bending rod with convex middle parts 32 are connected by a pin shaft, and the straight rod 31 and the bending rod with convex middle parts 32 are rotatable against the pin shaft and are foldable.

Optionally, the telescopic handle assembly comprises an inner handle pipe 81, an outer handle pipe 82, a ring grip 83, an unlocking connecting rod 84, an unlocking button 85, an upper compression spring 86, an unlocking seat 87, a shift fork 88, a lock seat 89, a lower compression spring 90, a locking block 91, a pipe plug for outer handle pipe 92, support connecting rods 93, and U-shaped connecting pieces 94; and the telescopic handle assembly is connected to the lower front connectors 14 by the U-shaped connecting pieces 94.

Optionally, the two side frames with columns and the two X-shaped support frames form a folding frame without upright column through the upper connectors 17; and the cloth basket 16 is detachably arranged on the folding frame without upright column through the upper connectors 17 and side connectors 18.

Embodiment 2

Figure 9:
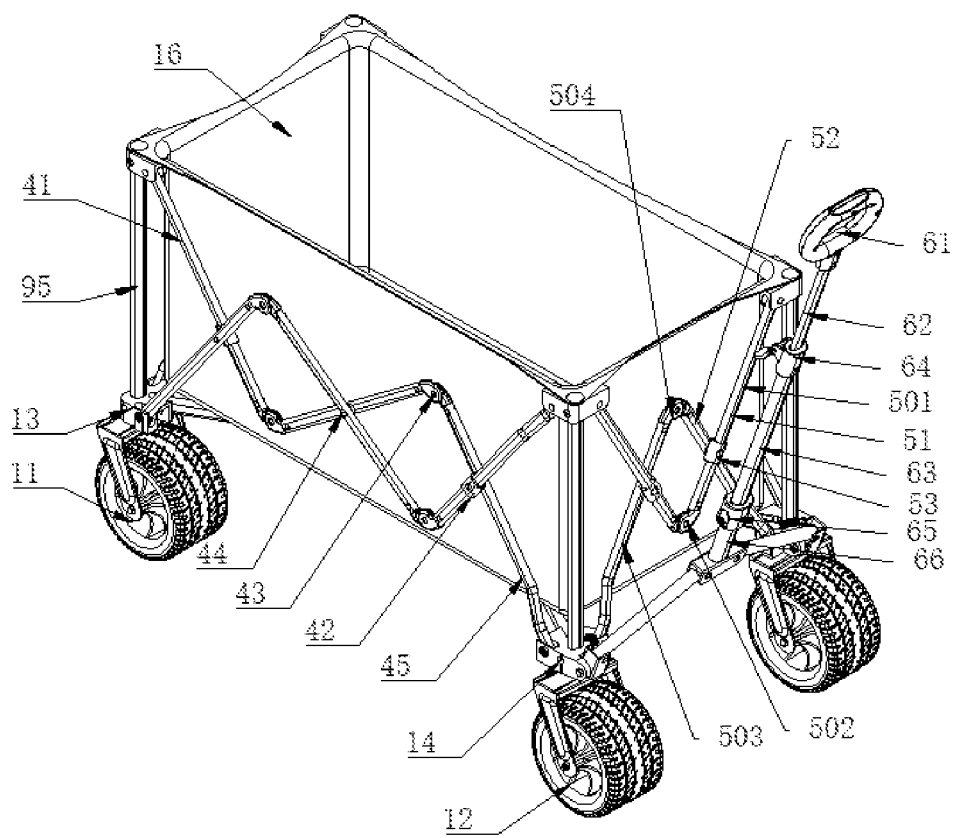
FIG. 9 is a schematic structural diagram of the portable folding wagon in the embodiment 2 of the present invention.
Figure 10:
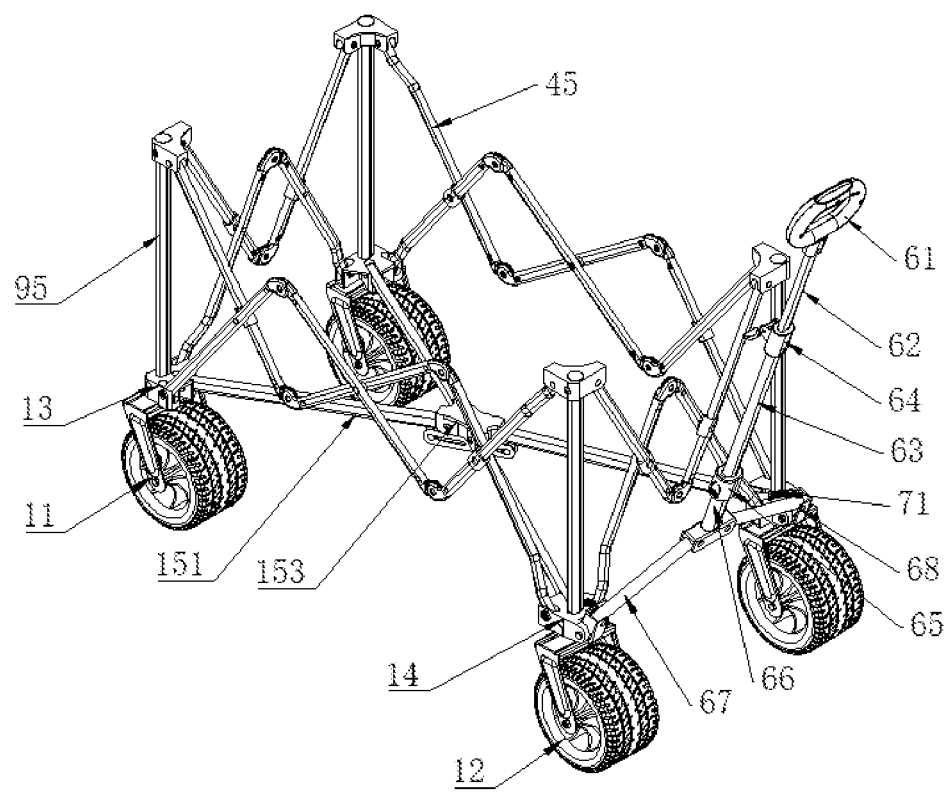
FIG. 10 is a structural schematic diagram (without a cloth basket) of the portable folding wagon in the embodiment 2 of the present invention.
Figure 11:
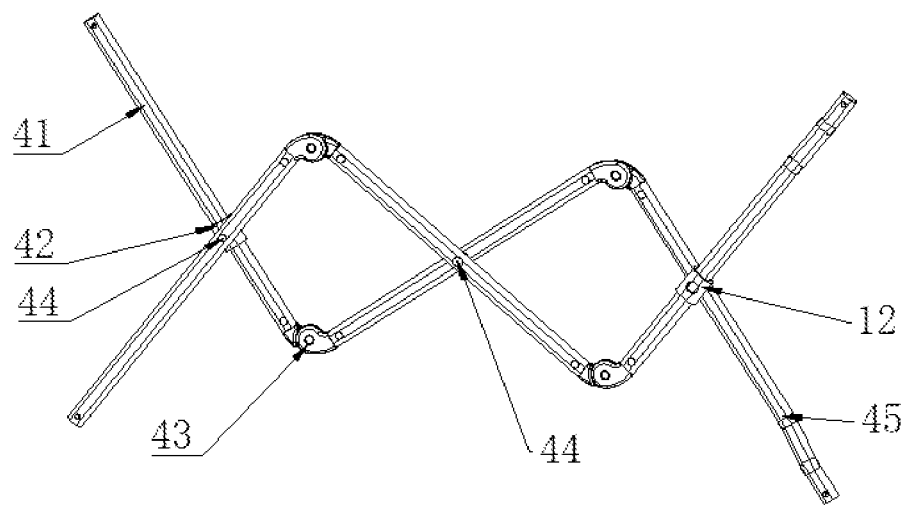
FIG. 11 is a schematic structural diagram of diagonal cross structure components of the portable folding wagon in the embodiment 2 of the present invention.
Figure 11:
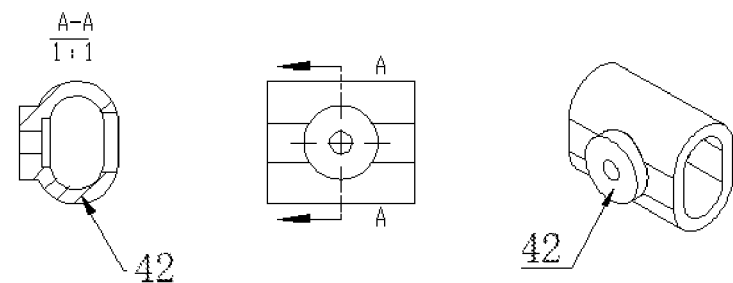
Figure 12:
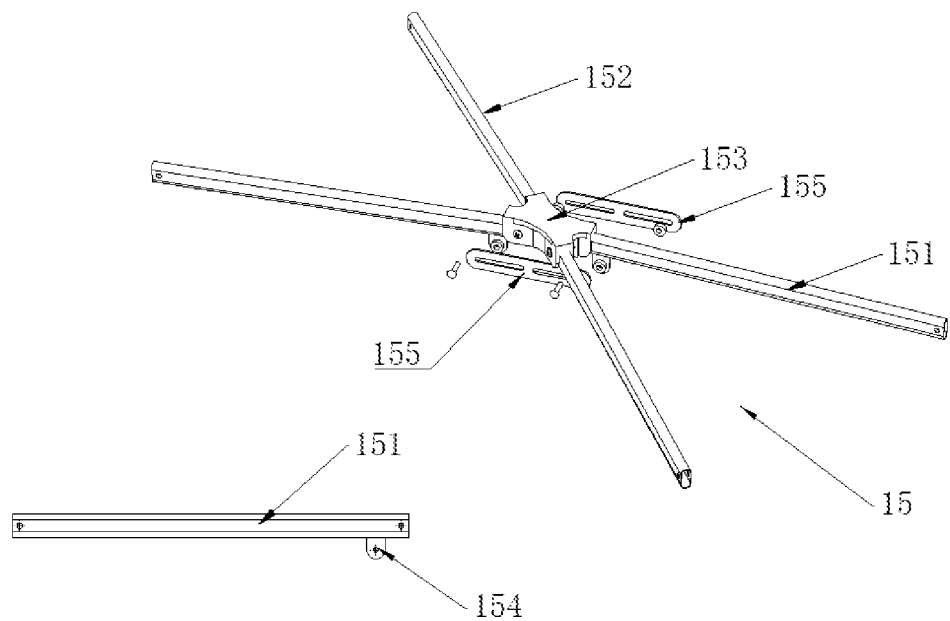
FIG. 12 is a schematic structural diagram of a foldable load-bearing bottom frame of the portable folding wagon in embodiment 2 of the present invention.
Figure 13:
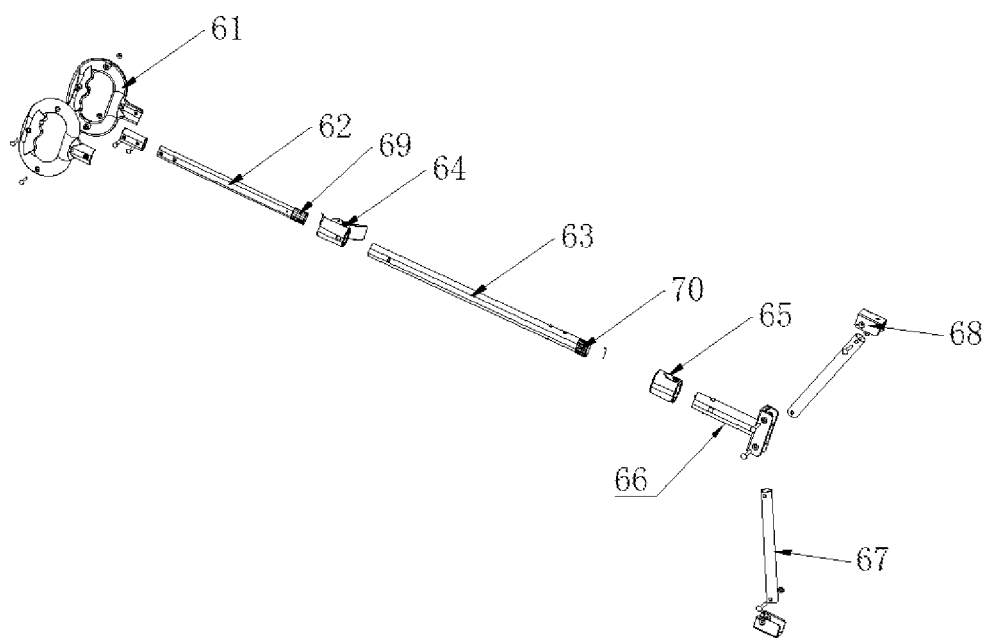
FIG. 13 is a schematic exploded diagram of a telescopic handle assembly of the portable folding wagon in the embodiment 2 of the present invention.
Figure 14:
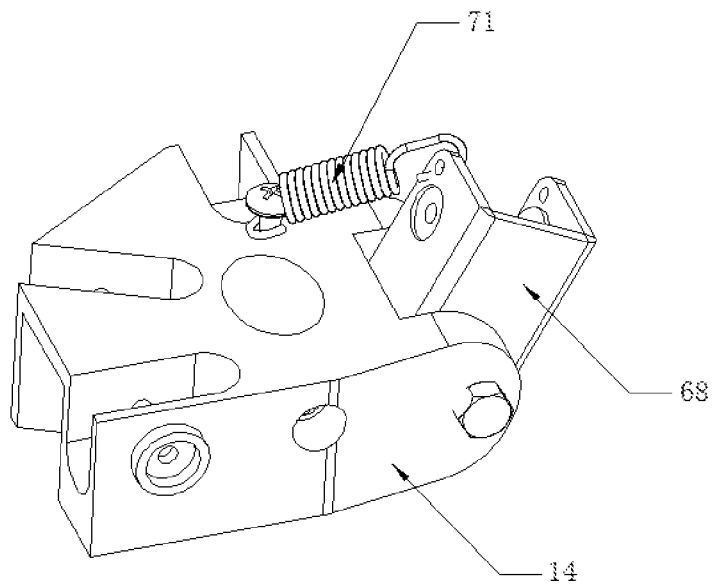
FIG. 14 is a schematic installation diagram of limiting springs of the portable folding wagon of the embodiment 2 of the present invention.
Figure 15:
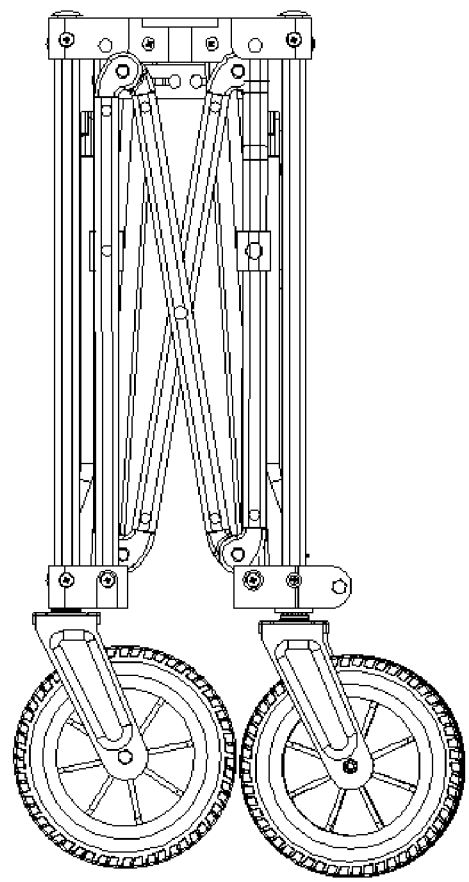
FIG. 15 is a schematic structural diagram showing a folding state of the portable folding wagon in the embodiment 2 of the present invention; and in the drawings: 11—fixed wheel; 12—universal wheel; 13—lower rear connector; 14—lower front connector; 15—X-shaped folding load-bearing frame; 16—cloth basket; 17—upper connector; 18—side connector; 151—metal support rod; 152—auxiliary support rod; 153—bottom connector; 154—connecting piece; 155—lower connecting plate; 21—X-shaped folding frame; 22—connecting joint; 201—straight side rod; 202—bending side bar; 31—straight rod; 32—bending rod with convex middle parts; 41—diagonal cross support frame; 42—sliding sleeve for diagonal cross support frame; 43—pivoting joint; 44—free-rotating rivet; 45—diagonal cross support frame with curved head structure; 51—V-shaped support frame; 52—inverted V-shaped support frame; 53—sliding sleeve for support frame; 501—support rod; 502—first rotary joint; 503—support rod with curved head structure; 504—second rotary joint; 61—ring handle grip; 62—inner handle pipe; 63—intermediate handle pipe; 64—lock for inner handle pipe; 65—lock for outer handle pipe; 66—outer handle pipe; 67—support connecting rod; 68—U-shaped connector; 69—pipe plug for inner handle pipe; 70—pipe plug for middle handle pipe; 71—limiting spring; 81—inner handle pipe; 82—outer handle pipe; 83—ring grip; 84—unlocking connecting rod; 85—unlocking button; 86—upper compression spring; 87—unlocking seat; 88—shift fork; 89—lock seat; 90—lower compression spring; 91—locking block; 92—pipe plug for outer handle pipe; 93—support connecting rod; 94—U-shaped connecting piece; and 95—column.

Referring to FIGS. 9-15, a portable folding wagon in one embodiment of the present invention comprises:

wheel components, four damping elements, a foldable load-bearing bottom frame, a foldable main frame, telescopic handle assembly and a cloth basket;

the wheel components comprise two fixed wheels 11 arranged at a rear part of the portable folding wagon and two universal wheels 12 arranged at a front part of the portable folding wagon;

the foldable load-bearing bottom frame comprise two lower rear connectors 13, two lower front connectors 14 and an X-shaped folding load-bearing frame 15;

the fixed wheels 11 are arranged below the lower rear connectors 13 through the damping elements, and the universal wheels 12 are arranged below the lower front connectors 14 through the damping elements;

the damping elements comprise one or more of damping springs, cylinder dampers or variable damping force shock absorbers;

and the X-shaped folding load-bearing frame 15 comprises two metal support bars 151 playing a main supporting role and two auxiliary support rods 152; the two metal support rods 151 and two auxiliary support rods 152 are combined into an X-shape through a bottom connector 153, and the two metal support rods 151 and two auxiliary support rods 152 are folded around the bottom connector 153; ends of the two metal support rods 151 are welded with connecting pieces 154; the connecting pieces 154 of the two metal supporting rods 151 are connected by a lower connecting plate 155; the lower connecting plate 155 is arranged underneath the bottom connector 153; and the two metal supporting rods 151 are foldable against the lower connecting plates 155.

Optionally, the foldable main frame comprises four columns 95, two diagonal cross structure components respectively arranged on left and right sides, and two support frames respectively arranged on front and rear sides.

Optionally, the diagonal cross structure components comprise diagonal cross support frames 41, sliding sleeves for diagonal cross support frame 42, pivoting joints 43, free-rotating rivets 44 and diagonal cross support frames with curved head structure 45.

Optionally, the support frames comprise a V-shaped support frame 51, an inverted V-shaped support frame 52 and sliding sleeves for support frame 53;

the V-shaped support frame 51 comprises two support rods 501 and a first rotary joint 502 connecting the two support rods together to form a V-shape; and the inverted V-shaped support frame 52 comprises two support rods with curved head structure 503 and a second rotary joint 504 connecting the two support rods with curved head structure 503 to form a V-shape.

Optionally, the telescopic handle assembly comprise a ring handle grip 61, an inner handle pipe 62, an intermediate handle pipe 63, an lock for inner handle pipe 64, an lock for outer handle pipe 65, an outer handle pipe 66, a support connecting rods 67 and U-shaped connectors 68; an pipe plug for inner handle pipe 69 is provided on a bottom part of the inner handle pipe 62, and a middle handle plug 70 is provided on a bottom part of the intermediate handle pipe 63;

and an end of each of the U-shaped connectors 68 is respectively connected with the lower front connectors 14 through pin shafts, and another end of each of the U-shaped connectors 68 is connected with the lower front connectors 14 through limiting springs 71.

The above embodiments are only used to illustrate technical solutions of the present invention, but not to limit them; although the present invention has been described in detail with reference to the foregoing embodiments, it should be understood by those skilled in the art that it is still possible to modify the technical solutions described in the foregoing embodiments, or to equivalently replace some technical features thereof; these modifications or substitutions do not make essence of the corresponding technical solutions deviate from spirit and scope of the technical solutions of various embodiments of the present invention.

The invention claimed is:

1. A portable folding wagon comprising:
   wheel components, four damping elements, a foldable load-bearing bottom frame, a foldable main frame, a telescopic handle assembly and a cloth basket;
   wherein:
   the wheel components comprise two fixed wheels (11) arranged at a rear portion of the portable folding wagon and two universal wheels (12) arranged at a front portion of the portable folding wagon;
   the foldable load-bearing bottom frame comprises two lower rear connectors (13), two lower front connectors (14) and an X-shaped folding load-bearing frame (15);
   the fixed wheels (11) are arranged below the lower rear connectors (13) through the damping elements, and the universal wheels (12) are arranged below the lower front connectors (14) through the damping elements;
   the damping elements comprise one or more of damping springs, cylinder dampers or variable damping force shock absorbers;
   the X-shaped folding load-bearing frame (15) comprises two metal support rods (151) and two auxiliary support rods (152); the two metal support rods (151) and two auxiliary support rods (152) are combined into an X-shape through a bottom connector (153), and the two metal support rods (151) and the two auxiliary support rods (152) are foldable against the bottom connector (153); ends of the two metal support rods (151) are welded with connecting pieces (154); the connecting pieces (154) of the two metal supporting rods (151) are connected by at least one lower connecting plate (155); the at least one lower connecting plate (155) is arranged on the bottom connector (153); and the two metal supporting rods (151) are foldable against the at least one lower connecting plate (155);
   the foldable main frame comprises two side frames and two X-shaped support frames, and the side frames the X-shaped support frames are foldable; and
   the side frames comprise respectively two X-shaped folding frames (21) connected by connecting joints (22); the X-shaped folding frames (21) comprise straight side rods (201) and bending side rods (202); middle parts of the straight side rods (201) and middle parts of the bending side rods (202) are connected by pin shafts; and the straight side rods (201) and the bending side rods (202) are rotatable against the pin shafts and are foldable.

2. The portable folding wagon according to claim 1, wherein the X-shaped support frames comprise respectively a straight rod (31) and a bending rod with convex middle parts (32), wherein an intermediate portion of the straight rod (31) and an intermediate portion of the bending rod with convex middle parts (32) are connected by a pin shaft, and the straight rod (31) and the bending rod with convex middle parts (32) are rotatable against the pin shaft and foldable.

3. The portable folding wagon according to claim 1, wherein the foldable main frame comprises four columns, two diagonal cross structure components respectively arranged on a left side and a right side of the foldable main frame, and two support frames respectively arranged on a front side and a rear side thereof.

4. A portable folding wagon comprising:
   wheel components, four damping elements, a foldable load-bearing bottom frame, a foldable main frame, a telescopic handle assembly and a cloth basket;
   wherein:
   the wheel components comprise two fixed wheels (11) arranged at a rear portion of the portable folding wagon and two universal wheels (12) arranged at a front portion of the portable folding wagon;
   the foldable load-bearing bottom frame comprises two lower rear connectors (13), two lower front connectors (14) and an X-shaped folding load-bearing frame (15);
   the fixed wheels (11) are arranged below the lower rear connectors (13) through the damping elements, and the universal wheels (12) are arranged below the lower front connectors (14) through the damping elements;
   the damping elements comprise one or more of damping springs, cylinder dampers or variable damping force shock absorbers;
   the X-shaped folding load-bearing frame (15) comprises two metal support rods (151) and two auxiliary support rods (152);
   the two metal support rods (151) and the two auxiliary support rods (152) are combined into an X-shape through a bottom connector (153), and the two metal support rods (151) and the two auxiliary support rods (152) are foldable against the bottom connector (153);
   ends of the two metal support rods (151) are welded with connecting pieces (154);
   the connecting pieces (154) of the two metal supporting rods (151) are connected by at least one lower connecting plate (155);
   the at least one lower connecting plate (155) is arranged on the bottom connector (153); and
   the two metal supporting rods (151) are foldable against the at least one lower connecting plate (155);
   the foldable main frame comprises four columns, two diagonal cross structure components respectively arranged on a left side and a right side of the foldable main frame, and two support frames respectively arranged on a front side and a rear side thereof; and
   the diagonal cross structure components comprise diagonal cross support frames (41), sliding sleeves for the diagonal cross support frames (42), pivoting joints (43), free-rotating rivets (44) and diagonal cross support frames with curved head structure (45).

5. The portable folding wagon according to claim 4, wherein the support frames comprise respectively an V-shaped support frame (51), an inverted V-shaped support frame (52) and sliding sleeves for support frame (53);
   the V-shaped support frame (51) comprises two support rods (501) and a first rotary joint (502) connecting the two support rods together to form a V-shape; and
   the inverted V-shaped support frame (52) comprises two support rods with curved head structure (503) and a second rotary joint (504) connecting the two support rods with curved head structure (503) to form a V-shape.

6. The portable folding wagon according to claim 1, wherein the telescopic handle assembly comprises a ring handle grip (61), an inner handle pipe (62), an intermediate handle pipe (63), a lock for inner handle pipe (64), a lock for outer handle pipe (65), an outer handle pipe (66), a support connecting rods (67) and U-shaped connectors (68); a pipe plug for inner handle pipe (69) is provided on a bottom part of the inner handle pipe (62), and a middle handle plug (70) is provided on a bottom part of the middle handle pipe (63);

and an end of each of the U-shaped connectors (68) is respectively connected with the lower front connectors (14) through pin shafts, and another end of each of the U-shaped connectors (68) is respectively connected with the lower front connectors (14) through limiting springs (71).

7. The portable folding wagon according to claim 1, wherein the telescopic handle assembly comprises an inner handle pipe (81), an outer handle pipe (82), a ring grip (83), an unlocking connecting rod (84), an unlocking button (85), an upper compression spring (86), an unlocking seat (87), a shift fork (88), a lock seat (89), a lower compression spring (90), a locking block (91), a pipe plug for outer handle pipe (92), support connecting rods (93), and U-shaped connecting pieces (94);

and the telescopic handle assembly is connected to the lower front connectors (14) by the U-shaped connecting pieces (94).

* * * * *